Aug. 30, 1932.  C. F. BECKWITH ET AL  1,874,858
LIQUID SUPPLY SYSTEM
Filed Sept. 4, 1928   3 Sheets-Sheet 1
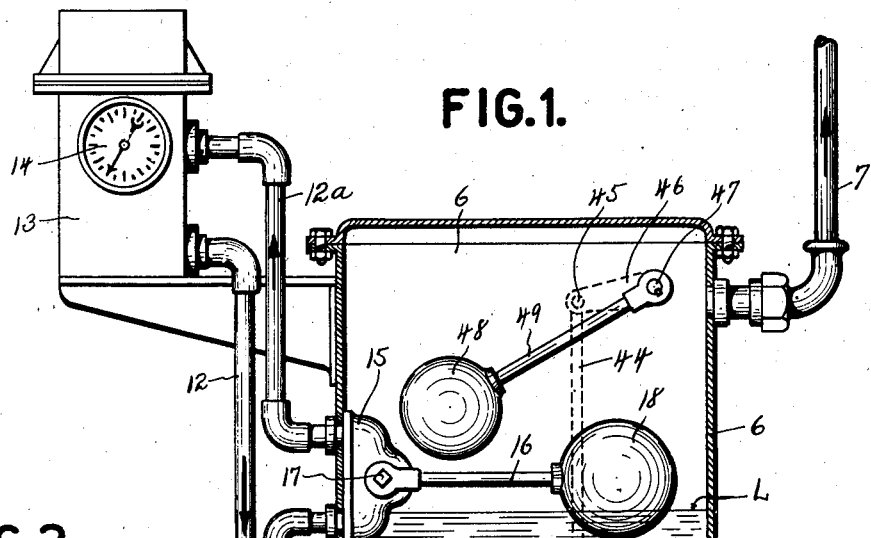
FIG.1.
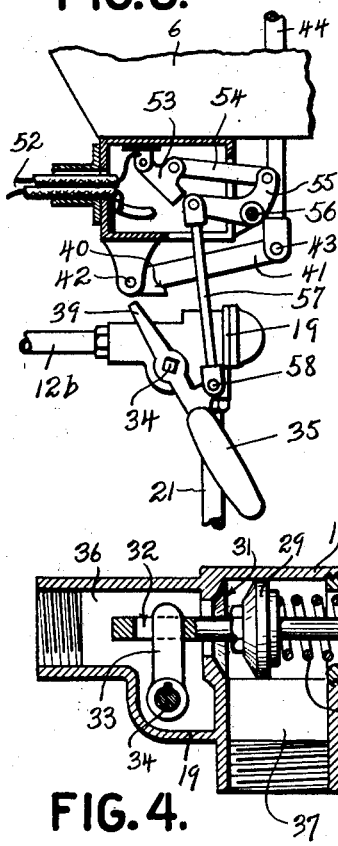
FIG.3.
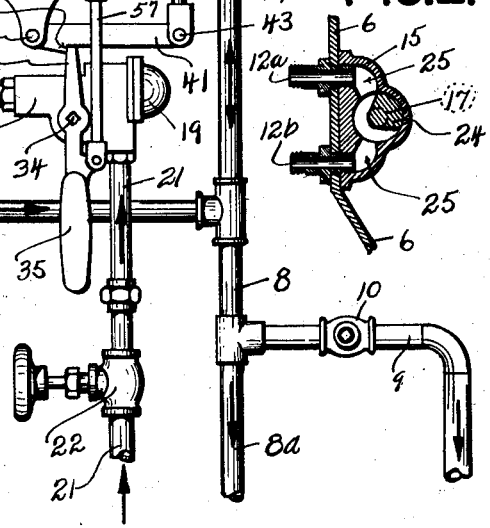
FIG.2.
FIG.4.
INVENTORS
CHARLES F. BECKWITH
C. CURTIS MAIN
Bohleber & Ledbetter
ATTORNEYS

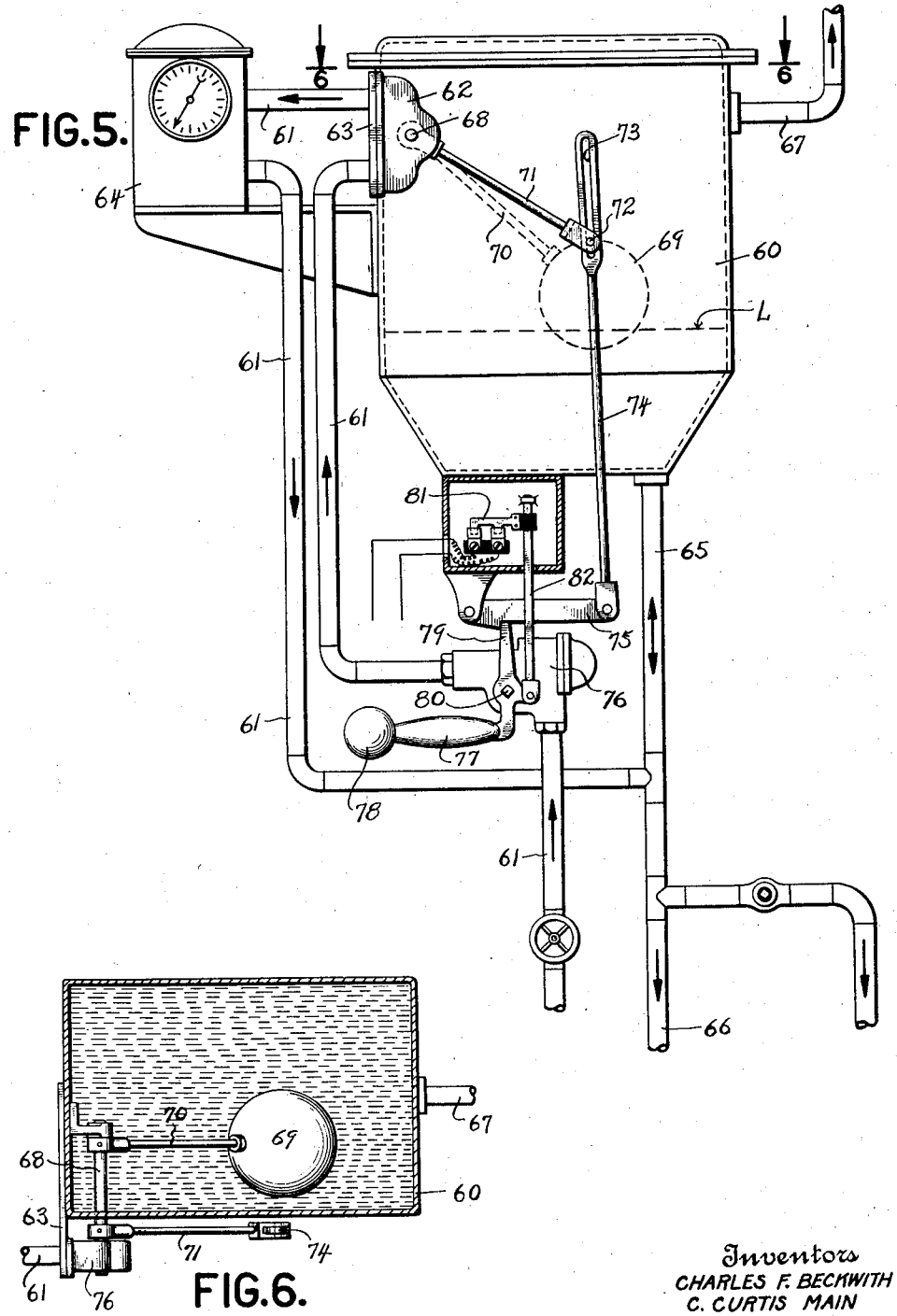

Aug. 30, 1932.  C. F. BECKWITH ET AL  1,874,858
LIQUID SUPPLY SYSTEM
Filed Sept. 4, 1928   3 Sheets-Sheet 3

Inventors
CHARLES F. BECKWITH
C. CURTIS MAIN
By their Attorneys

Patented Aug. 30, 1932

1,874,858

UNITED STATES PATENT OFFICE

CHARLES F. BECKWITH, OF FLUSHING, AND CHARLES CURTIS MAIN, OF PIERMONT, NEW YORK, ASSIGNORS, BY DIRECT AND MESNE ASSIGNMENTS, TO AQUA SYSTEMS INCORPORATED, OF NEW YORK, N. Y., A CORPORATION OF NEW YORK

LIQUID SUPPLY SYSTEM

Application filed September 4, 1928. Serial No. 303,629.

This invention relates to dispensing or fluid or liquid supply systems and more particularly to gasoline, oil or other fuel supply systems for feeding or dispensing gasoline to motor vehicles, and more especially relates to feeding fuel to one or a number of internal combustion engines.

A main object of the invention is to produce an efficient and safe gasoline supply, dispensing or feeding system for fueling one or more, particularly a large number of internal combustion engines running under test. For example in the manufacture of engines on a production basis it is necessary to simultaneously run-in, test, and adjust a large number of engines after they are assembled. For this purpose we have produced a gasoline supply system which is reliable and safe for use in factories for the purpose of supplying a constant head or supply of fuel to engines on dynomometers and test stands being run-in and inspected preliminary to final approval before leaving the factory.

Another and primary object is to produce a liquid supply system including valve means operated under two general conditions to positively maintain a constant liquid head. Under one condition a valve opens and closes to regulate the liquid level and maintains the same at a desirable level when the apparatus is functioning normally. Under the other condition another valve is positively and automatically closed by action of the liquid level rising above the desirable level as caused by an abnormal condition as by a leak or other failure somewhere in the apparatus.

A further object is to produce an automatic float-controlled electrical-switch and valve-appliance means adapted to become operative, as a final safety measure, to stop the flow of liquid to the apparatus from the source, which may be any storage tank or means, in case the apparatus develops a leak which might get beyond the ability of the liquid-level-control unit or means to actually control.

The gasoline supply system disclosed herein not only affords a safe and convenient method of uniformly maintaining a constant hydrostatic head of gasoline for fueling a large number of engines running on test stands and the like, but also measures the fuel consumed by the engines on test, and in case the attendants forget to close-off and stop the apparatus when the engines are not running, the automatic means will do so.

While the description is in general devoted to gasoline feeding systems, it is well to note that the apparatus is useful in a variety of industries where fluid or liquid handling is required.

In order to disclose the principle of the invention there is shown in the accompanying drawings several examples of construction wherein similar principles are involved, but it is to be understood that changes in construction and operation may be made without departing from the principles of the invention.

Sheet 1 of the drawings shows an example of the apparatus wherein a plurality of floats, say two floats, are independently co-ordinated with a like number of valves and one electric switch. In this way the possible failure of one independent float and valve unit to shut off the liquid simply brings into operation another float and valve unit to perform that purpose.

Figure 1 shows a vertical sectional view of the fuel supply apparatus or system in normal operating position with the gasoline at a level very nearly high enough to represent normal and constant feed level with all valves open and with an electric switch closed (when a circuit and switch is used in the invention) and consequently an electric circuit is closed to run a motor driven pump or hydraulic-water-force-feed system, or other means, not shown, to force or admit gasoline through the feed and inflow pipes into the receiving chamber from whence it is dispensed to the engines, not shown.

Figure 2 shows an example of a section of a float-actuated or fluid-level-control valve which starts and stops the flow of gasoline to the receiving chamber to maintain the gasoline liquid at a constant operating level and thus provide a constant flow and feed to the engines.

Figure 3 shows a fragmentary sectional view of the apparatus with a switch box and in which a switch is operatively connected with mechanism which opens and closes a safety-cut-off valve so that when the switch is open the valve is closed as shown in this view, whereas when the switch is closed the valve is open as shown in Figure 1.

Figure 4 shows a longitudinal section of the safety-cut-off valve which is ordinarily manually opened to set the system in operation and which is automatically closed by power means in case the flow of fuel to the engine ceases and the level of the fuel rises above a normal predetermined operating point in the gasoline receiving chamber beyond the control of the liquid-level-control float and its valve.

Sheet 2 of the drawings shows a first modified form of the invention wherein one float controls the operation of two or more valves and one or more electric switches. This form of the invention is simplified in respect to the floats and in the fact that a liquid-level-control valve is mounted outside of the liquid receiving chamber.

Figure 5 shows a side elevation of the first modified form of construction with the liquid-level-control float in low position indicating that the liquid has fallen below normal operating level and is flowing into the chamber to raise the level to normal operating height.

Figure 6 is a horizontal section on the line 6—6 of Figure 5 looking down on the float in the chamber and liquid-level-control float mounted outside the chamber.

Sheet 3 of the drawings shows a second modified form of construction to illustrate a simple type of single-valve-operated floats and without electric switch.

Figure 7:
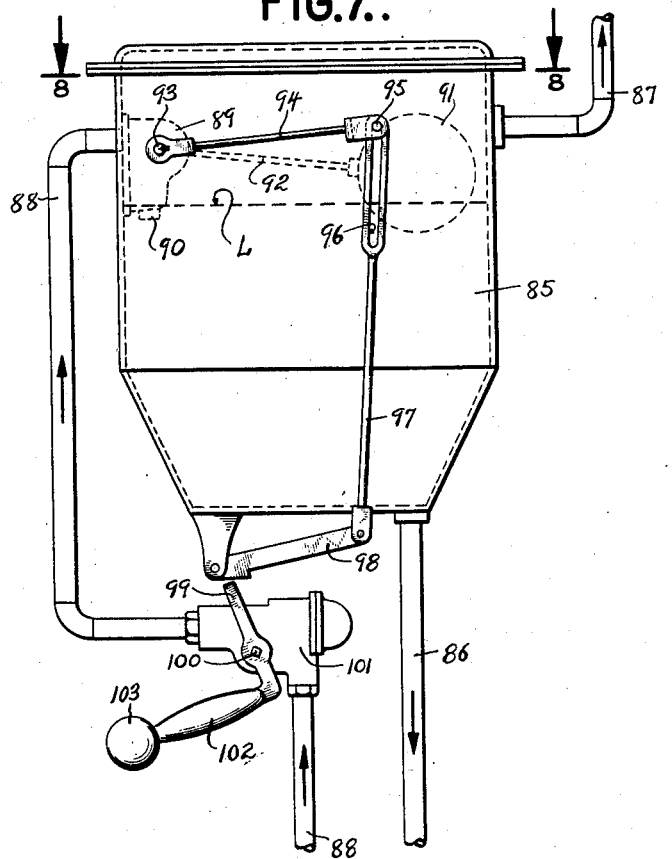

Figure 7 is a side elevation showing the position of parts at abnormal high-liquid-level position with the safety valve closed to positively stop the flow of liquid to the receiving chamber.

Figure 8:
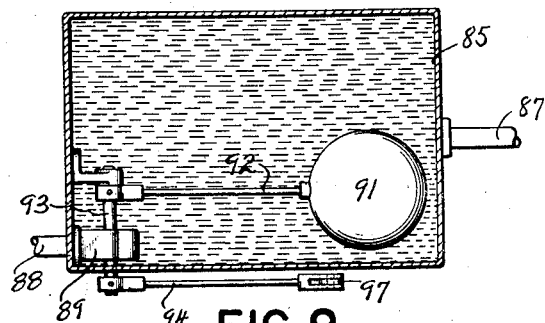

Figure 8 is a cross section on the line 8—8 of Figure 7.

The liquid supply system constituting the invention includes improvements to render safe the operation of one or any number of internal combustion motors which in a factory or laboratory must be tested and adjusted under running conditions and which must be fueled for long periods in test runs. A fuel receiving chamber is provided, the inflow of fuel thereto being governed by one or more valves which are controlled by a float or floats, one of which may also control a switch and electric circuit (if the latter are used) to stop the pumping of or hydraulically elevating of fuel oil from storage tanks, not shown, or to stop the flow thereof to the receiving chamber from any source.

A fuel receiving chamber 6 is mounted in service position, preferably above the engines to be fueled and may be vented through a pipe 7 out through the roof of the building so as to remove the air from the sealed chamber 6 to provide an unrestricted flow of gasoline to and from the chamber and to otherwise increase the safety of the system. An inflow and discharge pipe or pipes 8 is connected with the fuel receiving chamber 6. While two separate and independent pipes may be connected with the chamber 6, one as an inflow pipe and the other as a discharge pipe, it follows in the present example of the invention that there is shown one pipe 8, considered in two sections 8 and 8a, serving both purposes. The combination inflow and discharge piping 8—8a has connected thereto a return pipe 9 which leads to the gasoline tanks not shown, the latter frequently being located underground, especially so if gasoline is the liquid being handled. The return pipe 9, with a cut-off valve 10 therein, is used to empty the chamber 6 of gasoline when it is desired to inspect the apparatus or for other purposes.

An inflow pipe 12 connects with the combination inflow and discharge pipe 8—8a. The inflow pipe 12 leads from a meter 13 having an indicator 14 to measure the gasoline which passes through the apparatus and the meter may or may not be used as desired. The inflow pipe 12 leads from the meter, in effect as a continuation of pipe 12a which connects with a fluid-level-control valve 15 mounted in this instance within the receiving chamber 6. The fluid-level-control valve 15 has a float arm 16 connected to a valve shaft 17 and a fluid-level-control float 18 rests on the surface L of the liquid to automatically control, i. e. open and close and to vary the size of the passage through, the valve 15. A pipe 12b, in effect as a continuation of pipe 12—12a, runs from the fluid-level-control valve 15 to a safety-cut-off valve 19, a detail of which is shown in Figure 4.

A main-feed-inflow pipe 21 connects with the safety-cut-off valve 19 and a hand valve 22 is included in the pipe 21 to positively stop the flow of gasoline through the inflow piping 21—12 if desired. The pipe 21 connects with any source of fuel supply. Any suitable pump, hydraulic apparatus, gravity flow, or air pressure means may be used to force the gasoline up through the pipe 21 to the liquid supply apparatus.

Gasoline flows upwardly through the main feed pipe 21, through the safety-cut-off valve 19, through the liquid-level-control valve 15, through the meter 13, and back through inflow pipe 12 to the chamber 6 by connecting with pipe 8 where the gasoline either flows upwardly to the chamber 6 and/or downwardly through discharge pipe 8a to the engines or other point of consumption. The apparatus is designed so that the gasoline supply to the chamber 6 is greater than the consumption through the pipe 8a. The gasoline therefore backs up in pipe 8 and into the chamber 6 establishing a constant hydrostatic head L which is maintained practically at the same working level at all times regardless of the variable rate of consumption.

A description will now be given of the fluid-level-control valve 15 as shown in Figures 1 and 2. In Figure 1 the gasoline is still rising and the liquid-level-control float 18 is riding on the rising surface L and hence the valve 15 is gradually being closed so that if the fluid level L shown in Figure 1 continues to rise, the valve 15 will shortly be closed which stops the flow of gasoline through piping 12b—12 to piping 8—8a. On the other hand as gasoline is consumed through pipe 8a the level of gasoline in chamber 6 recedes, the float 18 will cause the valve 15 to gradually open to increase the flow of gasoline to the chamber 6. The float 18 and valve 15 constitute the main operating-level-control unit 18—15 to maintain a predetermined constant level or head of gasoline in chamber 6.

In Figure 2, the valve shaft 17 is shown journaled in the valve casing 15 and a valve segment 24 is fixed to the shaft. A passage 25 is made through the valve casing 15 to connect with the pipes 12a and 12b. The valve segment 24 opens and closes the upper passage 25 depending upon the position of the float 18. When the float 18 rises, the segment 24 turns counter-clockwise and gradually closes the upper passage 25 thereby shutting off the flow of gasoline to the chamber 6. On the other hand as the float 18 gravitates downwardly with the falling level of gasoline, the valve segment 24 does not rotate across the lower passage 25 to close it because the segment is so formed that maximum downward movement of the operating-level-float 16—18 is afforded without closing the lower valve passage 25. In other words the lower portion of the passage 25 is maintained open as the float 18 travels downwardly.

The normal-working-level or liquid-level-control float 18 so controls the action of the fluid-level-control valve 15 that the normal operating level L of gasoline in the chamber 6 is maintained substantially as shown or at a point somewhat thereabove or at any other predetermined level to which the apparatus may be adjusted. It is clear from the foregoing description that gasoline flows upwardly from its source, not shown, through the feed pipe 21, through the valve 15 and back through the pipe 12 where the gasoline is distributed to the chamber 6 and to the discharge pipe 8a in accordance with the rate of consumption from 8a. So long as the apparatus normally functions the rate of consumption at pipe 8a may increase or decrease and such variation is well taken care of by the operating float-and-valve unit 18—15.

Special precautions are taken to render this fuel feed or dispensing apparatus safe and to this end there is provided a safety-cut-off valve 19 within the piping system, say in the feed and inflow pipes 21—12b. The function of the safety-cut-off valve 19 is to close the pipe line 21—12b against the feed of gasoline in case the liquid-level-control valve 15 fails for any reason to function as for example by wear, leak or otherwise fail and thereby cause the gasoline level L to rise in the chamber 6. Note for example that if the liquid-level-control valve 15 should leak due to a grain of sand or sediment lodging therein and no gasoline is drawn from discharge pipe 8a for considerable time, that eventually the chamber 6 might overflow through the vent 7 to the roof with consequent wastage and danger.

To avoid the foregoing possibility, there is provided a float-controlled electric-circuit-and-switch mechanism. This mechanism is shown operative in Figure 3 to positively stop the flow of gas which is accomplished by closing the safety-cut-off valve 19 so that under abnormal working conditions the gasoline flow is stopped at valve 19. On the other hand the mechanism is shown in Figure 1 as being inoperative to hold the valve 10 open as in Figure 4 so that, normally, gasoline flows to the valve 15 to be there regulated in accordance with the rate of consumption from pipe 8a. If for any reason the flow of gasoline through the apparatus gets beyond the control of the liquid-level-control float and valve unit 15—18, the mechanism shown in Figure 3 functions to positively close the safety valve 19 shown open in Figure 4 and which will now be explained in detail.

The power closed safety-cut-off valve 19 is shown in elevation and is closed in Figure 3 and is shown in section and open in Figure 4. Its casing 19 carries a plunger 27 slidable in a guide 28 and which plunger carries a closure of valve disc 29. A compression spring 30 as power means has one end seated against the valve disc 29 to continually urge the latter toward closed position against a valve seat 31 defining a connecting passage between necks 36 and 37 and hence pipes 12b and 21. The outer free end of the valve plunger 27 is slotted at 32 to receive the movable end of a valve-actuating arm 33 anchored to a shaft 34 journaled in the casing 19. A handle 35 is anchored to the shaft 34 in order that an attendant may manually open the valve 19 to Figure 4 position against the force of the power means 30. This is accomplished by swinging the handle 35 in a clockwise direction to slide the plunger 27, compress the spring 30 and move the valve disc 29 to the right and away from the valve seat 31 thus opening valve neck 36 through to valve neck 37 so that gasoline may flow from pipe 21 through valve 19 into the pipe 12b. The valve 19 is described as being closed by power means, say by gravity, by the spring 30, by an electric motor or other means; and the handle 35 is used to set the power means to a tensioned or operating position.

Obviously a positive means of some suitable form must be provided to hold the valve-setting handle 35 in vertical or open position to maintain the valve-closure head or disc 29 open against the force of the power spring 30, a weight or other power closing means. To this end the upper part of valve handle 35 is integrally formed with a trigger or catch arm 39 which engages a shoulder 40 made on a latch 41. One end of the latch 41 is pivoted at 42 on any suitable stationary support while the outer free end thereof is pivotally connected at 43 to a float operated rod 44 which extends upwardly by and outside the chamber 6. The upper end of the rod 44 connects at 45 to an arm 46 anchored to a transverse shaft 47 and which is journalled in the chamber 6. On the inside of the chamber and offset from the float 16—18, there is mounted a safety float carried on an arm 49 anchored to the transverse shaft 47. The safety float 48—49 is mounted above and to one side of the liquid-level-control float 18 so that the two floats may not interfere in operation.

The safety or uppermost float 48 does not come into play until the gasoline level L rises substantially high in the chamber 6 and gets beyond the control of the liquid-level-control float 18. In case the liquid level does rise beyond the control of float 18, it follows that the safety float 48 is lifted upwardly and the rod 44 lifts the latch 41 which disengages the latch notch or shoulder 40 from the valve or handle-catch 39 whereupon the valve spring 30 is free to expand thus positively snapping the valve disc 29 to its seat and closed position thereby shutting off the flow of liquid through the inflow piping. Hence it matters not if the operation of valve 15 should for any reason be impaired or fail because the valve 19 automatically shuts off the flow at pipe 21 before gasoline reaches the valve 15.

After the valve 19 is closed, there would remain pressure on the gasoline on the feed piping 21 and against the valve 19 unless provided against. This is due to the fact that some form of pumping, hydraulic lifting means, or other feed is necessarily required to force the gasoline through the inflow piping system 21—12b to the chamber 6 and hence if the valve 19 leaks there might occur a slight seepage of gasoline by the valve 19 into the inflow pipe and hence through valve 15, if the latter should leak, and into the chamber 6.

Pumping and hydraulic systems, or gravity or air-pressure feed systems are frequently electrically controlled; pumps usually being electrically driven, while hydraulic or other systems are usually provided with a valve which may be opened and closed by a solenoid. In any case the gasoline force feed means, not shown, for forcing gasoline from a storage source up through the pipe 21 are electrically controlled and hence we provide a circuit 52 therefor and this circuit may be considered the same in principle whether running a motor or energizing a solenoid.

The circuit 52 includes a switch 53 which is coordinated to work with the valve 19, say the shaft 34 thereof. The pivoted switch arm 53 is actuated by a link 54 connected to suitable operating mechanism in turn connected with the valve shaft 34. The mechanism for example may include a bell crank 55 pivoted at 56 on any suitable stationary support. The bell crank 55 is connected with a link 57 the lower end of which is pivotally connected at 58 to handle 35. Two positions of this mechanism are shown, one in Figure 1 where the mechanism is idle because the entire system is functioning normally, and another in Figure 3 where the mechanism is active or has acted because the gasoline level L reached a point too high for safety in the chamber 6.

It is evident that when an operator works handle 35, the switch control mechanism 55 also works the switch 53. In other words when the attendant desires to start the system in operation, he swings handle 35 in clockwise direction and hence the bell crank 55 is turned counterclockwise and the switch 53 is closed which closes the circuit 52 thereby starting a motor or a hydraulically driven means to force gasoline through the pipe 21 and through the safety-cut-off valve 19 which was also opened to Figure 4 position when the operator moved handle 35 to the left. At the same time, the spring 30 is compressed and remains so to automatically open the switch 53 and close the valve 19 when need therefor arises.

As the operator moves the handle 35 to the left, the catch 39 slides under latch 41 so that the safety float 48 is properly poised and set in the chamber 6 ready to function in case the liquid level L rises beyond the control or reach of the fluid-level-control float 18. The operator may simply lift the rod 44 with one hand and set the handle 35 and switch with the other to start the flow of gasoline up through the pipe 21. Furthermore the operator may trip the latch 41 to stop the system as at the end of the day if desired by lifting the rod 44 to release the handle 35 which lets the spring 30 go and the spring then closes the valve 19, opens the switch 53 and breaks the circuit 52. Any suitable form of trip mechanism may be substituted for the one 39—41 shown.

Figure 3 shows that position of the coordinated electric-switch and safety-cut-off valve means 19—53 after the liquid lever L has risen beyond the control of the float and valve unit 15—18. Therefore the position of parts in Figure 3 is such that the safety valve 19 is closed to stop the flow of gasoline to the inflow pipe 12. Furthermore the circuit 52 is broken so that all fluid pressure is removed from main feed pipe 21. Hence there is no possibility of gasoline seeping upwardly past either of the valves 19 or 15 for the reason that the pumping means is automatically stopped by the positive operation of the upwardly moving float 48 when the gasoline level rises above the control of the normal-operating float-valve means 18—15.

One float 48 remains idle above the other 18 until said lowermost float 18 loses control. The normal-operating-control unit 15—18 under usual and normal conditions perform all the necessary functions of the apparatus. The switch-operating means, including handle 35, bell crank 55 and related parts shown, are simply by way of example of operating means for the coordinated switch and valve. Any suitable switch-and-valve operating means may be used equally well. While there are shown two valves and two floats with one coordinated switch, it will be seen that any suitable number of these parts may be used. Obviously a suitable type of switch, such as a tiltable-mercury-contact type, would preferably be used. The switch shown is diagrammatic. In some forms of the invention the switch and circuit is not required at all.

Preferably at least one of the valve is on the inside of the chamber 6 as shown at 15 in one form of the invention. Gasoline may be caused to run from valve 15 directly into the chamber 6 if desired and hence the meter 13 may be eliminated from the system.

Reference is now made to sheet 2 of the drawings, Figures 5 and 6, showing a simple form of the invention and a single float having three functions is there shown.

A gasoline receiving chamber 60 is fed from a source of supply, not shown, through an inflow pipe 61 which connects with a liquid-level-control valve 62 located in any convenient position, in this case outside of the chamber and mounted on a bracket 63. A shaft 68 connects the float 69 with valve 62 to actuate the latter on the outside of the chamber 60 as shown in Figure 6. The inflow pipe 61 may connect with a meter 64, when the latter is used, thereby leading gasoline through the meter and down to a pipe 65 where the gasoline flows upwardly into the chamber 60.

A discharge pipe 66 conveys gasoline to the engines or other point of use or consumption not shown. The chamber 60 may be vented at 67 if desired.

The liquid-level-control valve 62 simply may be considered the same as valve 15 in Figure 2 or any other type readily operable by a float 69 and arm 70 to gradually close said valve 62 as the liquid level L rises and to open the valve 62 as the level falls. In this respect the float 69 performs the same function as already explained for the similar float 18 in the first form. In other words the float 69 and valve 62 constitute a normal-level-control unit and so long as the apparatus functions normally, the liquid level remains approximately where shown in Figure 5.

Safety-cut-off means is provided to positively close the inflow pipe 61 in case the liquid-level-control unit 69—62 fails or should develop a leak at a time when no gasoline is being consumed from pipe 66 thereby tending to over-fill the chamber 60. To this end an arm 71 is fixed to shaft 68 or is otherwise connected to the float 69 and has a pin 72 anchored in its outer free end to slide in the slot 73 of a rod 74. The lower end of the rod 74 is pivotally connected with a valve latch 75 which engages and holds a safety-cut-off valve 76 to the locked-open normal-operating position shown.

The safety valve 76 is the same form as the safety valve 19 already described. It is power closed by a spring and/or weight while it is manually opened and set in position, ready to be automatically closed by a handle 77 weighted at 78 urging the valve toward closed position. In the position shown the valve 76 is open and is being held open by latch 75 which engages a catch 79 fixed on the valve shaft 80. However, if the gasoline level L rises considerably above that shown and the pin 72 engages the upper end of the slot 73 it follows that rod 74 lifts latch 75 and frees valve operating means, here the weight 78, thereby moving the handle 77 counter-clockwise and closing the safety valve 76. To again start the system, an attendant lifts the weighted valve handle 77 until the latch or lock-open means 75—79 are engaged to hold open the safety valve 76.

As the valve setting or lock-open mechanism 75—79 is released to allow the power-actuated-safety valve 76 to automatically close, a switch 81 is simultaneously opened by force of the power-actuated safety valve working through a link or other means 82. The switch 81 controls an electric circuit which in turn governs the flow of gasoline from the source of supply through the inflow pipe 61. When the switch 81 is open, the electric circuit controlled thereby is broken and gasoline ceases to flow upwardly in pipe 61 and hence there is no pressure on the closed valves 76 and 62. There is an advantage in removing the pressure from the inflow pipe line in that it makes for safety when gasoline is being handled.

Thus is shown a single float 69 which first actuates a normal-level-control valve 62 without in any way disturbing the open position of the safety valve 76 and the closed position of the switch until emergency arises. Thereupon the single float performs the three functions as above explained, first that of regulating the size of the opening through the valve 62 to maintain the liquid-level L at a desirable operating level to always supply the engines drawing fuel from the lower end of the discharge pipe 66, second that of tripping the safety valve 76 to cause it to automatically close in case the liquid-level L rises beyond the control of the float and valve control unit 69—62, and third that of opening the switch 81 to stop the pressure and flow of gasoline from the source up through inflow pipe 61 when the safety valve 76 is automatically closed.

A description will now be given of sheet 3 showing the second modified form of the invention in Figures 7 and 8 wherein the apparatus is further simplified by omitting the circuit and switch elements.

A gasoline receiving chamber 85 discharges or feeds gasoline through a pipe 86 to the engines or other point of consumption not shown. A vent pipe 87 vents the chamber and frees it of air and fumes. An inflow pipe 88 connects with a liquid-level-control valve 89 inside the chamber and which discharges gasoline at 90 into the chamber and valve 89 may as well be of like or similar construction to the formerly described valves 15 and 62.

A liquid-level-control float 91 is carried on an arm 92 which is fixed on a shaft 93 journalled in the chamber 85 and the shaft 93 is connected with the valve to operate it. As the float 91 gravitates downwardly, the valve 89 is increasingly opened to increase the flow of gasoline into the chamber 85 to raise the level L to a normal operating height.

The outer end of the shaft 93 is fixed to an arm 94 carrying a pin 95 which slides freely up and down in a slot 96 of rod 97 during normal rise and fall of the float 91 in the chamber. The rod 97 is connected to a latch 98 which engages a valve catch 99 fixed on the shaft 100 of safety valve 101 mounted in the inflow pipe 88.

The safety valve 101 is power-actuated and is the same general type as the safety valves 19 and 76 heretofore explained and may be automatically closed by a weight 103 or by a spring, or by both a weight and spring. A handle 102 is also fixed to the safety-valve shaft 100 by which an attendant may lift the weight 103 and reset the weight-operated valve 101 to open position when the system is started in operation.

The position of parts shown in Figure 7 is that of emergency high liquid level and the float has risen far above its normal range of rise and fall motion in the chamber with the result that the pin 95 has reached the upper extremity of the slot 96 and has lifted the rod 97 and tripped or released the latch 98. Thus the valve catch 99, which holds up the weight 103, is released and the weight has fallen to close the safety valve 101 and close the inflow pipe 88 against further gasoline flow to the chamber 85 until an attendant again sets and starts the apparatus.

The type of apparatus shown in Figures 7 and 8 is well suited for many requirements and often the electric circuit and switch control heretofore described with the other forms can be dispensed with.

The liquid supply system disclosed in the two modified examples of construction provides float means, say one float, and valve means, say two or more valves, the liquid-level-control valve and the power-actuated safety valve, with one valve connected to the float by a rigid connection or joint such as an arm or other means 70 or 92, and thus the liquid-level-control valve 62 or 89 is continuously regulated during normal operating liquid level as the float 69 or 91 moves up and down. On the other hand a slip or loose motion slidable connection or joint, as in the pin and slot connections 72—73 or 95—96, affords a connection from the float to the power actuated safety valve 76 or 101 which, during normal liquid level, does not disturb the stationary set-open position of the safety valve until abnormal high level is reached, whereupon the safety valve is caused to automatically close.

While the examples of the invention show the circuit control switch and safety valve located beneath the receiving chamber, it is to be understood that these and other parts may be located at any convenient place.

This gasoline feed and dispensing apparatus is presented to fill the need of engine manufacturers and provides a safe system and one in which the fuel supply is automatically cut off in case consumption is discontinued and followed by any failure such as a leak in the valve means, and therefore provides an ideal and simple system wherein the hydrostatic head is uniformly maintained at one working level.

What is claimed is:—

1. In a liquid supply system, a receiving chamber and an inflow pipe connected therewith, valves included in the inflow pipe, and floats mounted in the chamber, one float being above the other and each float being connected with a valve, whereby one valve and float are actuated at one level of the liquid in the chamber and the other valve and float are actuated at a higher liquid level in the chamber.

2. In a liquid supply system, a receiving chamber and an inflow pipe connected therewith, valves included in the inflow pipe, and floats mounted in the chamber, one float being above the other and each float being connected with a valve, whereby one valve and float are actuated at one level of the liquid in the chamber and the other valve and float are actuated at a higher liquid level in the chamber, an electric circuit, a switch included in the circuit, and a connection between the switch and uppermost float, whereby the uppermost float when lifted by the rising liquid level opens the switch and the circuit.

3. In a liquid supply system, a receiving chamber and an inflow pipe connected therewith to fill the chamber and a discharge pipe connected therewith to dispense liquid therefrom, valves included in the inflow pipe, a fluid-level-control float connected to one valve to maintain the liquid at a constant operating level in the chamber, an electric-circuit-control means connected with another valve, and a safety float connected with the electric-circuit control means and hence with the last named valve to simultaneously operate the same.

4. In a liquid supply system, a receiving chamber, an inflow pipe and a discharge pipe connected thereto, a fluid-level-control valve also included in the inflow pipe and being placed within the receiving chamber, a fluid-level-control float within the chamber and being operatively connected with the fluid-level-control valve to open the same as the liquid level recedes and to close the same as the liquid level rises in the chamber, a safety-cut-off valve included in the inflow pipe and including self-actuating means to automatically close the same, mechanism whereby to manually open and hold open the safety-cut-off valve against the force of the self-actuating means to cause the liquid to flow to the chamber, and a safety float within the chamber and connections from the safety float to the mechanism to release the latter to permit the safety-cut-off valve to be self actuated and closed in event the liquid rises in the chamber above the control of the fluid-level-control float.

5. In a liquid supply system, a receiving chamber, an inflow pipe and a discharge pipe connected thereto, a fluid-level-control valve also included in the inflow pipe and being placed within the receiving chamber, a fluid-level-control float within the chamber and being operatively connected with the fluid-level-control valve to open the same as the liquid level recedes and to close the same as the liquid level rises in the chamber, a safety-cut-off valve included in the inflow pipe and including self-actuating means to automatically close the same, mechanism to manually open and hold open the safety-cut-off valve against the force of the self-actuating means to cause liquid to flow to the chamber, an electric circuit and a switch therein, a connection between the switch and the mechanism whereby the switch is opened to break the circuit when the safety-cut-off valve is automatically closed as aforesaid, and a safety float within the chamber and connections from the safety float to the mechanism to release the latter to permit the safety-cut-off valve to be self actuated and closed in the event that liquid rises in the chamber above the control of the liquid-level-control float.

6. In a liquid supply system, a receiving chamber with an inflow-and-discharge-piping system connected thereto, two valves included in the inflow piping system to provide a plural control of the liquid level within the chamber, one of the valves being wholly within the chamber and the other valve outside thereof, two floats within the chamber and means connecting each float to a valve, and one float being operatively mounted high within the chamber and above and offset from the other float, whereby the uppermost float becomes operative only in event the other float rises above a predetermined level.

7. In a liquid supply system, a receiving chamber with an inflow-and-discharge-piping system connected thereto, two valves included in the inflow piping to provide a plural control of the liquid level within the chamber, one of the valves being wholly within the chamber and the other valve outside thereof, two floats within the chamber and means connecting each float to a valve, one float being operatively mounted high within the chamber and above and offset from the other float, whereby the uppermost and offset float becomes operative only in event the liquid rises above a predetermined level, a handle attached to the valve mounted outside of the chamber and used to open the valve, power means operatively engaging the last named valve and urging it closed, mechanism to lock the last named valve open against the force of the power means, and a connection between the mechanism and uppermost float to trip the mechanism and unlock the latter valve to permit the power means to close said valve and move the handle to closed position.

8. A liquid supply system as defined in claim 7 and wherein an electric circuit and switch is used, and a connection between the switch and the mechanism whereby the switch is opened when the last named valve is closed.

9. In a liquid supply system having a chamber and piping connected thereto, a valve having a closure and being included in the piping, power means in the valve to automatically close the same, a shaft journalled in the valve and having a connection with the power means to tension the same for automatic operation, a handle fixed on the shaft to manually open the closure and work the connections to manually tension the power means, a latch cooperating with the handle and shaft to lock open the valve closure and hold against the valve-closing force of the power means, a float within the chamber and having operating connections with the latch to trip the latter, an electric switch and operating connections therefrom to the shaft whereby the switch is opened when the float trips the latch, and a power circuit connected with the switch adapted to be coordinated with suitable pumping means.

10. In a liquid supply system having a receiving chamber and a piping system connected therewith, a liquid-level-control valve mounted within the chamber and being connected to the piping system whereby liquid passes through the valve and through the chamber but does not empty into the chamber, a pipe connected with the valve conveying liquid from the valve and a meter connected with the last named pipe, a pipe conveying liquid from the meter to the chamber, a liquid-level-control float operatively connected with the valve to control the flow of liquid through the meter to the chamber and to maintain a predetermined operating level, an electric circuit and a single switch included therein, and a safety float mounted within the chamber and having connections with the single switch to open the same in case liquid rises in the chamber above said predetermined operating level.

11. In a liquid supply system, a receiving chamber and an inflow pipe connected thereto, a liquid-level-control valve in the inflow pipe to maintain a normal operating liquid level in the receiving chamber, a safety valve mounted outside the chamber, a single float pivotally mounted in the chamber, automatic closing means for the safety valve and a latch to hold the safety valve open, a positive connection from the float to the liquid-level-control valve, and a loose connection from the float to the latch to trip the latter when the float rises above the normal operating liquid level.

12. In a liquid supply system, a receiving chamber and inflow pipe connected thereto, a liquid-level-control valve mounted in the inflow pipe, a safety valve mounted in the inflow pipe, an electric circuit and switch, power means to automatically close the safety valve and open the switch, latch means to hold open the safety valve and hold closed the switch, a float operatively connected to the liquid-level-control valve to maintain a normal-liquid level, and an operating connection from the float to the latch means to release the same and permit the safety valve to close and the switch to open when the liquid level rises to abnormal height.

13. In a liquid supply system, a receiving chamber and inflow piping connected thereto, regulating means comprising with the inflow piping connected to said valve to maintain a normal-operating-liquid level in the chamber, a discharge pipe connected to the valve, a section of inflow piping leading from the discharge pipe to the chamber, safety means to automatically stop the flow of liquid thru the inflow piping in case the regulating means fails to maintain the aforesaid normal-operating-liquid level in the chamber, and electric power circuit and switch means therein connected and actuated by the safety means to break the circuit in case the normal operating-liquid level is not maintained as aforesaid.

14. In a liquid supply system, a receiving chamber and inflow pipe connected thereto, a liquid-level-control valve and a safety valve included in the inflow pipe, power-actuated means to automatically close the safety valve, latch means to normally hold the safety valve open, float means pivotally mounted in the chamber, a positive connection from the float means to the liquid-level-control valve to continuously operate the same as the float means moves up and down with the changing liquid level in the chamber, and a loose motion connection from the float means to the power-actuated safety valve and latch means by which the safety valve remains stationary and open during normal movement of liquid-level-control valve, whereby the float means normally and continuously regulates the liquid-level-control valve but upon reaching an abnormal height causes the latch means to be released to permit the safety valve to automatically close.

15. In a liquid supply system, a liquid receiving chamber and inflow pipe connected thereto, a liquid-level-control valve in the inflow pipe and a float connected thereto for maintaining a normal working liquid level in the chamber, a safety valve mounted in the inflow pipe and including automatic closing means therefor, lock-open latch means to hold the safety valve open against the automatic closing means, and a slip connection from the float to the lock-open latch means whereby the liquid-level control valve moves with the float during normal operation without releasing the lock-open latch means.

16. A liquid supply and dispensing system comprising a receiving or storage chamber, a combination inflow and discharge pipe to fill the chamber and dispense liquid therefrom, another pipe connected with the combination inflow and discharge pipe and forming a piping system leading to and from the chamber, valves included in the piping system, power means to automatically close one valve and a handle to manually open it, trip and latch mechanism to normally hold open the last named valve against the closing force of the power means, a float mounted in the chamber and having operating connections with the trip and latch mechanism to release the power means to close the last named valve if said float rises above a normal operating liquid level, and another float in the chamber and operatively connected with the other valve to vary the opening of the latter to maintain the liquid at said normal operating level.

17. A liquid supply system comprising a storage chamber and a piping system connected thereto, a valve included in the piping system, a combination manual-automatic mechanical operating means connected with the valve whereby it is manually set to open position and automatically actuated to closed position, an electric power circuit including a switch operatively connected with the mechanical operating means whereby the switch automatically opens to break the power circuit when the valve automatically closes to stop the liquid flow and the switch is manually closed when the valve is manually opened, a float mounted in the chamber and having mechanical connections to the operating means to actuate the same when liquid in the chamber lifts the float to a predetermined height.

18. In a liquid supply system, a receiving chamber and inflow piping connected thereto, regulating means cooperating with the inflow piping to maintain a normal-operating-liquid level in the chamber; an electric power circuit and switch means therein connected, float means controlled by the rise of the liquid to open the switch and break the power circuit, normally-open valve means in the inflow piping, power means urging against the valve means tending to close the latter; a handle and operating connections therefrom to the valve means, to the power means and to the switch to manually set these three elements to operative position; a latch normally interlocked with the handle to hold the three elements set to normal operative position, and an operating connection from the float means to the latch to release the handle.

In testimony whereof we affix our signatures.

CHARLES F. BECKWITH.
CHARLES CURTIS MAIN.